United States Patent [19]

Martin

[11] Patent Number: 4,795,258
[45] Date of Patent: Jan. 3, 1989

[54] NONPLANAR THREE-AXIS RING LASER GYRO WITH SHARED MIRROR FACES

[75] Inventor: Graham J. Martin, Canoga Park, Calif.

[73] Assignee: Litton Systems, Inc., Beverly Hills, Calif.

[21] Appl. No.: 34,731

[22] Filed: Apr. 6, 1987

[51] Int. Cl.$^4$ ............................................. G01C 19/64
[52] U.S. Cl. ...................................... 356/350; 372/94
[58] Field of Search ........................... 356/350; 372/94

[56] References Cited

U.S. PATENT DOCUMENTS

| | | |
|---|---|---|
| 3,741,657 | 6/1973 | Andringa . |
| 3,862,803 | 1/1975 | Yntema et al. . |
| 4,229,106 | 10/1980 | Dorschner et al. . |
| 4,247,832 | 1/1981 | Sanders et al. . |
| 4,397,027 | 8/1983 | Zampiello et al. .................. 356/350 |
| 4,407,583 | 10/1983 | Simms . |
| 4,477,188 | 10/1984 | Stiles et al. . |
| 4,548,501 | 10/1985 | Smith et al. . |
| 4,616,929 | 10/1986 | Bernelin et al. ..................... 356/350 |

Primary Examiner—Vincent P. McGraw
Assistant Examiner—S. A. Turner
Attorney, Agent, or Firm—Elliott N. Kramsky

[57] ABSTRACT

A ring loser gyroscope for sensing rotations about three orthogonal axes. A frame includes and internal arrangement of three intersecting cavities, each of which is arranged for measuring rotation about one of the orthogonal axes. Each cavity comprises a non-planar arrangement of four cavity legs. A pair of anodes and a cathode cooperate with the intersecting cavities and, in one embodiment, with bypass tubes, whereby undesired Fresnel-Frizeau phase shifts are eliminated by gas flow effect cancellations.

7 Claims, 4 Drawing Sheets

NONPLANAR THREE-AXIS RING LASER GYRO WITH SHARED MIRROR FACES

BACKGROUND

1. Field of the Invention

The present invention relates to inertial sensors. More particularly, this invention pertains to an improved design for a ring laser gyroscope.

2. Description of the Prior Art

The multioscillator has been proposed as a means for overcoming the "lock-in" problem in ring laser gyroscopes. As is well known, lock-in refers to the tendency of counterpropagating beams to lase at a single frequency, or lock point, at low input rotation rates. As such, ring laser gyroscopes are essentially insensitive to rotation rates below known characteristic thresholds. The range of input rates over which the gyro gives no output is known as the "dead band". One common means of overcoming this insensitivity is known as mechanical dither and involves the application of a bounded oscillatory motion to the gyro frame. In this manner the gyro is continually swept through the dead band and the effects of lock-in can be greatly reduced. The shortcomings of the mechanically dithered gyroscope are well recognized in the art.

In essence, the multioscillator operates as a pair of two-mode ring laser gyroscopes that share a single cavity. The multioscillator light cavity sustains a substantially left circularly polarized (LCP) beam pair, comprising one beam circulating in the clockwise direction and the other in the counterclockwise direction and a substantially right circularly polarized (RCP) beam pair also comprised of counterprogagating beams. Ideally, each beam pair acts independently as a two-mode ring laser gyroscope and senses body rotation by means of the Sagnac effect.

In order to achieve independent operation of these two gyroscopes within the same cavity, a means is applied to the cavity to ensure that the two beam pairs, one pair of LCP light and the other of RCP light, operate about different frequencies. This separation of frequencies is known as "reciprocal splitting" and is typically on the order of a few hundred MHz. Early multioscillator designs achieved the necessary reciprocal splitting by the placement of a suitably aligned optically active element in a three- or four-mirrored cavity as is described, for example in U.S. Pat. Ser. No. 3,741,657 of Andringa for "Differential Laser Gyro System". The addition of an intercavity element increases cavity losses. This is detrimental to gyro performance and a preferred method for producing reciprocal splitting is the use of a non-planar light path which produces different round-trip shase shifts for LCP and RCP light and, hence, different lasing frequencies. This method is described in Ser. Nos. 4,229,106 of Dorschner et al. for "Electromagnetic Ring Resonator" and 4,585,501 of Smith et al. for "Laser Gyroscope System".

With the reciprocal splitting technique in operation, the two gyros of the multioscillator configuration can operate independently but each will still be subject to the lock-in phenomenon. Unlike the mechanically dithered gyro in which an "a.c." bias is appied via the dither, the multioscillator circumvents this problem by applying a "d.c." bias to the two gyros so that each operates about a point far removed from dead band. This bias is known as "nonreciprocal splitting" and is accomplished by introducing a Faraday rotation into the cavity. When circularly polarized light passes through a Faraday rotator, it experiences a phase shift that depends upon the direction of propagation through the rotator. In such a manner the clockwise and counterclockwise beams in each gyro experience different phase shifts and thus lase at different frequencies. Typical values for the nonreciprocal splitting in a multioscillator are much smaller (about 1 MHz) than the reciprocal splitting. Nonreciprocal splitting can be achieved by use of an intracavity element, made of suitable glass, mounted within an axial magnetic field such as that described in the above-referenced United States patent of Andringa or by surrounding the gaseous gain medium of the cavity by an axial magnetic field as described in the Dorschner et. al. patent.

When nonreciprocal splitting is applied to the multioscillator in the prescribed manner, the resulting bias shift in the left circularly polarized gyro is equal but opposite in sign to the bias shift in the right circularly polarized gyro. Thus, when the outputs of the two gyros are summed, the resultant signal is doubly sensitive to body rotation but independent of the magnitude of the applied bias. In this way, the differential nature of the multioscillator makes it inherently insensitive to bias variations that can be caused, by example, by changes in magnetic field, temperature or the like, which have proved to be a major problem in single gyro, two-mode designs that utilize a d.c. bias.

Navigation systems must measure spacedependent variables, such as rotation, with respect to (or about) a set of three orthogonal axes. The foregoing description of a multioscillator does not address the problems inherent in attempting to achieve a practical sensor that is sensitive about three measuring or input axes. The design of a three-axis multioscillator or, in fact, any ring laser, that is sufficiently compact and realizable in a manufacturing sense is beset by numerous difficulties. In the operation of a ring laser the chosen fill gas(es) necessarily interact with applied electrical fields to produce the desired lasing action. Thus,the design of any ring laser gyroscope must provide for the positioning of anodes and cathodes in addition to locating mirror faces and internal bores.

A sensor designer must recognize the problems posed by a device whose operation relies upon the generation of current flows in a gaseous meduim. Unavoidable gas flows within the laser cavity can prove quite deleterious to the long-term operation of the device. So-called Langmuir flow effects can degrade laser performance considerably, producing, inter alia, unwanted thermal bias. Such effects have been compensated to varying extents in some single axis devices by the symmetrical placement of a plurality of electrodes about the body of the instrument. Generally this has implied the use of numerous electrodes. Thus, both the Dorschner et al. and the Smith et al. patents employ multiple anode arrangements while the planar multioscillator of Andringa utilizes two cathodes and a single anode for measuring rotation about a single axis.

The United States patents of Stiles et al., (Ser. No. 4,477,188) and Simms (Ser. No. 4,407,583) disclose the incorporation of three planar gyro cavities in to a single block. The expansion of a ring laser concept to a unit for measuring rotation about three orthogonal axes necessarily complicates the problem of providing a suitable arrangement of electrodes. The Stiles et al. device utilizes six anodes and two cathodes while the Simms apparatus includes six anodes and a single cathode. The use of a considerable number of electrodes substantially complicates instrument design. Each electrode must be sealably secured to (or within) the gyro frame in such a manner that the device remains airtight. This may add significant difficulties to the fabrication process.

The physical size of the electrodes complicates device design. A large number of electrodes will consume a correspondingly-large percentage of the frame's surface area for mounting. The size and shape of the block-frame may not be reducible to a sufficient extent to prevent arcing or other unwanted electrical interactions therebetween. Thus, the design of a ring laser rotational rate sensor that is sensitive to rotation about three orthogonal axes is significantly complicated by unavoidable effects of gas flows.

Further, the capabilities (i.e. sensitivity) and price of the instrument are functions of the size of the block-frame. A design that requires added surface area for separation of electrodes necessarily adds to the cost of the instrument. Such added cost partially defeats the compactness advantages of a three axes-in-one block device and may render the design inappropriate for singleuse applications, such as guided missiles, wherein the premium is on economy and accuracy is not critical.

SUMMARY

The foregoing shortcomings of present-day ring laser gyroscope designs are addressed and overcome by the present invention that provides a ring laser gyroscope for measuring rotation about three mutually orthogonal axes. The gyroscope includes a three dimensional frame having a plurality of planar surfaces. The frame comprises a block having three intersecting, closed nonplanar cavities. Each of such cavities comprises four straight segments of equal lengths. A plurality of mirrors is mounted upon predetermined surfaces of the frame for directing light about the cavities. Such cavities and the surfaces of the frame are aranged so that the frame includes at least one mirror mounting surface for affixing one or more mirrors to direct light about at least two of the cavities.

The foregoing and additional features and advantages of this invention will become further apparent from the detailed description that follows. The written description is accompanied by a set of drawing figures. Numerals of the figures correspond to those of the written description, like numeral referring to like features of this invention throughout both.

DETAILED DESCRIPTION

Figure 1:
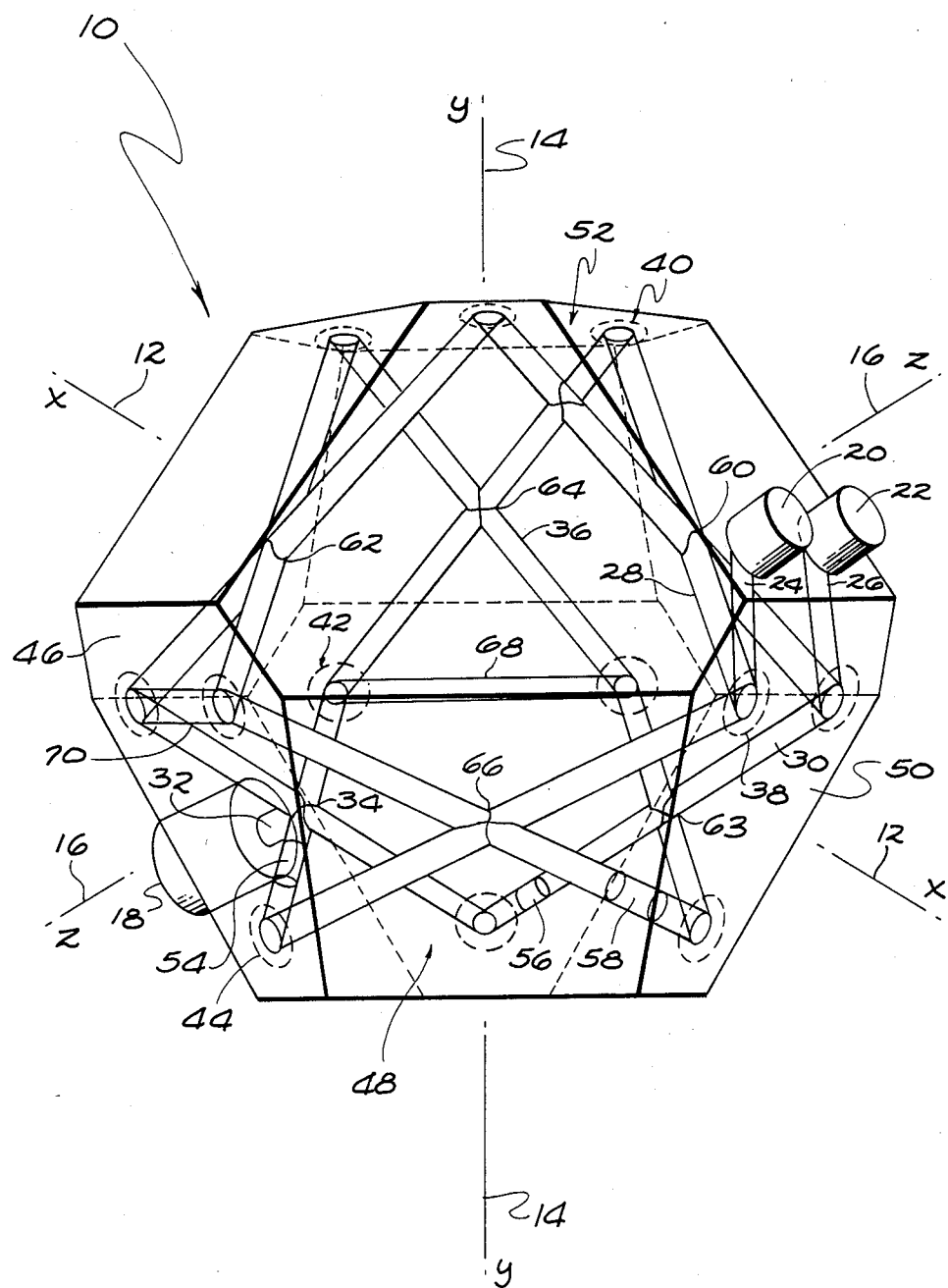
FIG. 1 is a perspective view of a symmetric multioscillator of the regular octahedron type in accordance with the present invention.

Turning now to the drawings, FIG. 1 is a perspective view of a symmetric multioscillator 10 of the regular octahedron type in accordance with the teachings of the present invention. In this figure and the following figure, numbers that point to features within or on the opposite side of the illustrated gyro frame are enclosed in parentheses (drawing figure only).

The "regular octahedron" designation refers to the fact that the frame of the multioscillator 10 is formed by selective truncation of an octahedron-shaped block of appropriate low thermal expansion material such as Zerodur. As will become apparent from the discussion that follows, the shape of the frame enables one to achieve numerous manufacturing and compactness advantages while a three-axis multioscillator that comprises a single integral block.

The multioscillator 10 is designed to measure rotations about three orthogonal axes 12, 14 and 16. A plurality of elongated bores or legs of equal lengths within the frame are arranged into three intersecting nonplanar laser cavities, each cavity comprising a closed, four-sided figure. The geometries of the exterior of the multioscillator frame and the interior cavities interact with other elements, including cavity mirrors and Faraday rotator elements, to permit the device to function effectively while utilizing only three electrodes, a cathode 18 and anodes 20 and 22. As discussed above, the resulting economy of electrodes permits the multioscillator 10 to be configured as a compact instrument, permitting greater packing efficiency. Very small gyroscopes are quite desirable in applications, such as guided missiles, whose packaging (space) restrictions and cost considerations predominate over accuracy requirements.

The electrodes 18, 20 and 22 are fixed to the frame of the multioscillator 10 by conventional means. The interior of each such electrode is, of course, in communication with the underlying laser cavities. As will become apparent from the discussion and the figures, the present invention is equally amenable to the utilization of electrodes (the cathode in particular) that are interior to the frame. Ample room is provided, in either embodiment, within the intersecting non-planar cavities for positioning such electrodes without departing from the scope of the invention. Entrance bores 24 and 26 connect anodes 20 and 22 respectively to legs of x-axis cavity 28 and y-axis cavity 30 respectively while exit bore 32 connects the cathode 18 to an intersection 34 of the cavities 28 and 30.

Each of the closed cavities is arranged to measure rotation about one the three axes. Thus, the above-referenced cavities 28 and 30 are sensitive to input rotations about axes 12 and 14 respectively while the closed cavity 36 measures rotation about the z-input axis 16. A mirror is located adjacent each of the intersections of bores or leg segments that comprise a single closed cavity. The mirrors are arranged to direct the counter-rotating laser beams within each cavity and, of course, one mirror of each set of cavity mirrors is designed for sufficient transmissivity to permit the measurement of beat frequencies within that cavity.

Taking the x-axis cavity 28 as representative, mirrors 38, 40, 42 and 44 are inclined with repect to the legs comprising the cavity 28 so that the laser light is transmitted substantially coincident with the bore axes that comprise that closed cavity and successively impinges the optical centers of the cavity mirrors.

The cavity mirrors are fixed to the surface of the multioscillator frame by optical contacting and/or cement. The mirrors are fixed to a limited number of the outer surfaces of the frame to minimize the amount and complexity of the polishing effort required in manufacture. In particular, three mirrors, each associated with one of the three separate closed cavities, are fixed to each of surfaces 46, 48, 50 and 52. Each of the aforementioned surfaces of the fourteen (14)-sided frame to which the mirrors are mounted is a remaining surface of the tetrahedron from which the frame is eventually manufactured through successive truncations. By providing this arrangement of mirrors, the angular (operational) requirements of a three-axis multioscillator are satisfied. Further, as mentioned above, the amount of polishing is minimized. A final advantage of the sharing of frame surfaces by three cavity mirrors is that such an arrangement permits the design of a three-axis multioscillator in accordancd with this invention wherein a single, large mirror is provided at each tetrahedron surface for effecting the desired operation of the instrument. Such a design may be particularly favored for a low cost, low accuracy, compact multioscillator gyro.

Referring back to the internal cavities of the frame, Faraday rotators 54, 56 and 58 are each located in one leg of each of the three closed cavities 28, 30 and 36 respectively. Each of the rotators comprises a thin piece of Faraday glass for effecting nonreciprocal splitting of the frequencies of the counterrotating beams of left and right circularly polarized light within each of the cavities. As will be seen, each rotator additionally provides a means for blocking unwanted discharge paths.

The regulation of gas flow within the instrument is additonally affected by the presence of various intercavity passages and connections. As mentioned earlier, a point of intersection 34 is provided adjacent the exit bore 32. The x-axis cavity 28 for measruing rotation about the x-axis 12 and the y-axis cavity 32 for measuring rotation about the y-axis 14 intersect at the point 34 to provide passage therebetween.

The same two closed cavities also intersect at the point of intersection 60. The y-axis cavity 30 intersects the z-axis cavity 36 for measuring rotation about the z-axis 16 at points of intersection 62 and 63 while the x-axis cavity 28 and the z-axis cavity 36 intersect at the points of intersection 64 and 66. A bypass tube 68 formed within the frame connects the x-axis cavity 28 with the z-axis cavity 36 while a bypass tube 70 interconnects the y-axis cavity 30 with the z-axis cavity 36 as shown.

Figure 2:
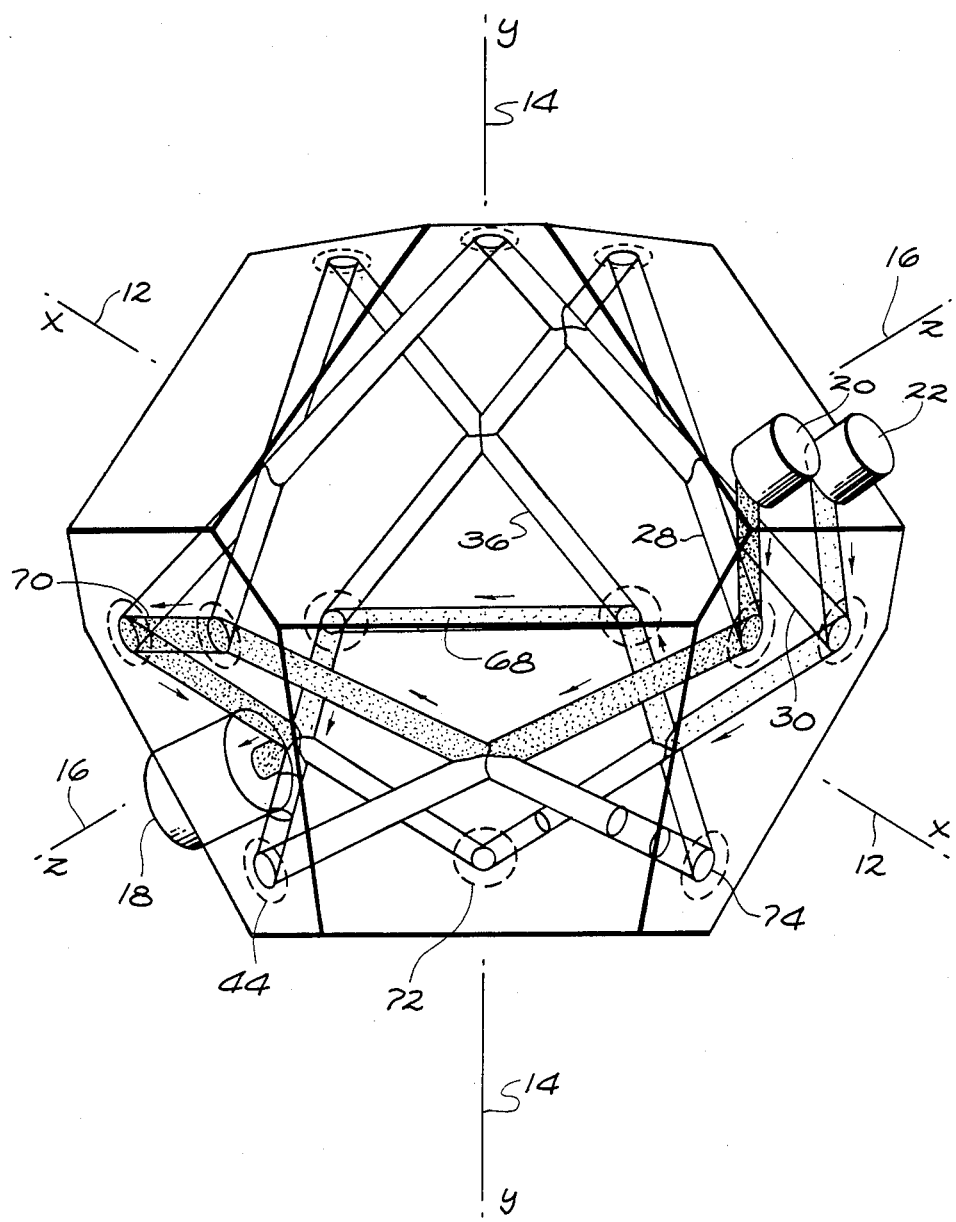
FIG. 2 is the perspective view of the invention of the prior figure including arrows for denoting the internal gas flows for counteracting FresnelFrizeau effects.

FIG. 2 is the perspective view of the invention of the prior figure that includes the regions of electrical discharge and arrows for denoting the internal gas flows within the multioscillator frame. The flows result from the overall geometry of the multioscillator including the shapes and intersections of the internal closed cavities, the placements of the various Faraday elements, the location of the bypass tubes 68 and 70, the anodes 20 and 22 and the cathode 18. It should be noted that electrical discharge paths follow the paths shown rather than a shorter journey past mirrors 44, 72 and 74 because of the blocking action of the Faraday elements 54, 56 and 58.

The multioscillator 10 is arranged to provide net gas flows within the cavities 28, 30 and 36 so that undesirable phase shifts that occasioned by well-known Fresnel-Frizeau effects are cancelled. It is well understood that the magnitude of such a phase shift is proportional to the magnitude of the net gas flow within a cavity and that the sign of the phase shift is a function of the direction of such net flow.

Arrows indicate the directions of gas flow within the cavities 28, 30 and 36. Such arrows refer to the primary flow in the centers of the bores where the laser beams circulating the cavity are situated. Each flow results from the well-understood tendency of the ionized current to flow from an anode to a cathode by a minimum path length. Current flow emanating from the anode 20 is indicated by denser stippling than that originating from the anode 22. It will be apparent that a Fresnel-Frizeau effect cancellation is produced in each of the closed cavities insofar the same length of clockwise gas flow is countered by an equal length of counterclockwise gas flow within each. It is further apparent that the Faraday rotators of the cavities create "no flow" regions that cooperate in the creation of flow cancellation within the cavities 28, 30 and 36.

Gas flow effects caused by Langmuir flow are reasonably well understood in three and four mirrored planar, single axis cavities with no intracavity elements. Dual discharge designs are used to cancel the resulting unwanted biases, due to the Fresnel-Frizeau effect. The discharge paths in both the octahedral and dodecahedral three axis configurations of this invention apply similar principles to cancel these effects. The various bore interconnections in these three-axis designs and the necessity of intracavity Faraday elements for the multioscillator complicate the task of analyzing gas flows but the inventor has found that the described discharge paths do in fact substantially cancel Fresnel-Frizeau biases.

Figure 3:
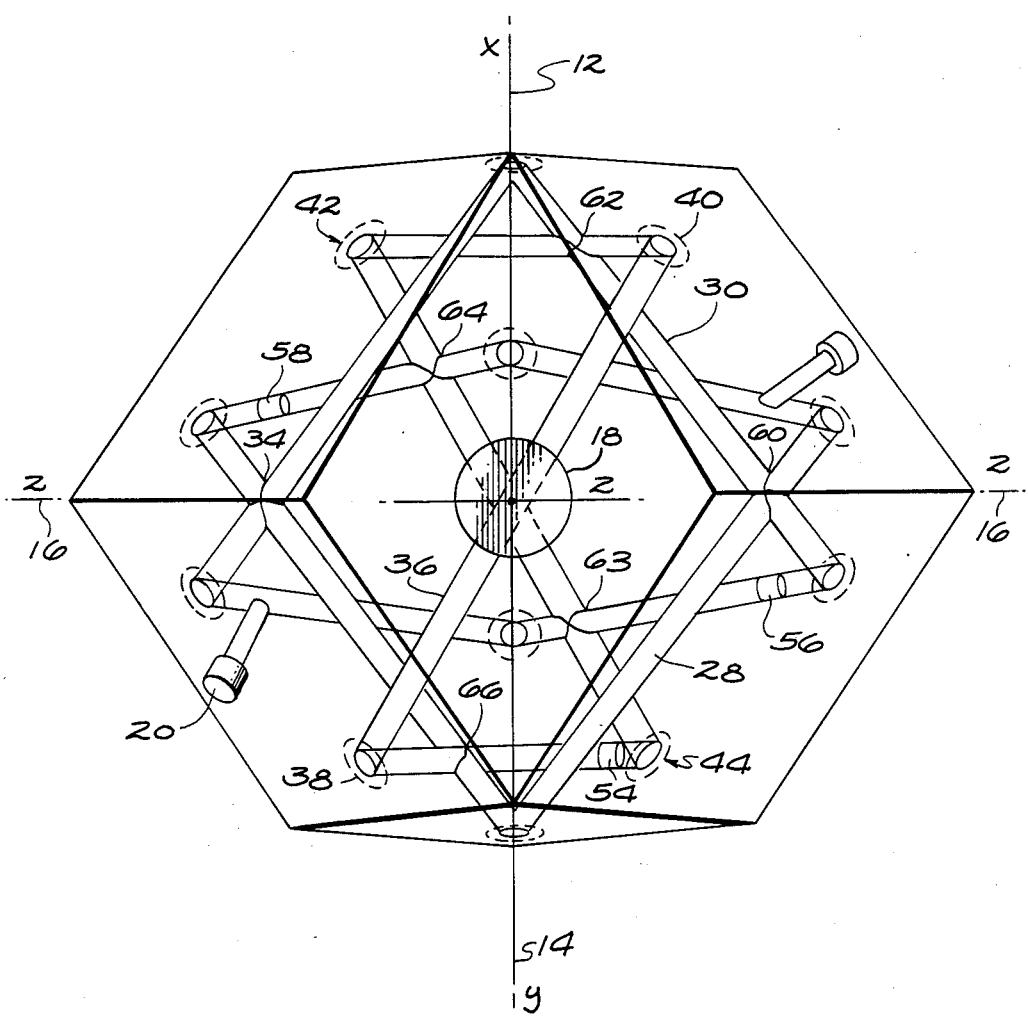
FIG. 3 is a perspective view of a symmetric multioscillator of the rhombic dodecahedron type in accordance with the invention.

FIG. 3 is a perspective view of an alternative symmetric multioscillator embodiment in accordance with the invention. In this figure, elements of the multioscillator that correspond to elements of the embodiment of FIGS. 1 and 2 are identified by like numeral. Thus, the cavities of the multioscillator of FIG. 3 are arranged so that the cavity 28 is sensitive to rotation about the axis 12, the cavity 30 is sensitive to rotation about the axis 14 and the cavity 36 is sensitive to rotation about the axis 16. The intersections of the various cavities are numbered in a similar manner to those of the embodiment of FIG. 1.

The illustrated embodiment utilizes a rhombic dodecahedron shaped frame. Such a frame is characterized by a total of twelve (12) surfaces. The twelve mirrors required for the three closed, nonplanar cavities 28, 30 and 36 are fixed to nine of the frame surfaces, three of which are "shared" by a pair of mirrors. As with the prior embodiment, the arrangement of the frame so that multiple mirrors are fixed to a single surface reduces mirror polishing effort and may permit the sharing of a single mirror by multiple closed lasing cavities.

Unlike the prior embodiment, the multioscillators of FIG. 3 utilizes no bypass tubes for creating intercavity flows. The inventor has found that, as will become apparent from the flow diagram of FIG. 4, all intercavity flows required to provide bias cancellation within the cavities are achieved in a regular dodecahedron-shaped frame without any need for additional passages. Also, in contrast to the prior embodiment, the cavities of the multioscillator are arranged so that the Faraday elements 54, 56 and 58 as shown in the following figure needn't participate in the creation of the required electrical discharge paths.

Whereas the frame of the preceding figure is of a geometry that permits variation of the absolute sizes of the surfaces and cavity lengths, the relative sizes of the surfaces and, consequently, the angles therebetween, of this embodiment are defined and constant. The angles of the surfaces directly effect the inclinations and placements of the cavity mirrors and, hence, determine the locations of the internal bores that comprise the ring cavities. Therefore, the resulting shapes, including aspect ratios, of the three closed cavities are effectively determined by the shape of the frame. Dimensional changes can produce only scaling variations, and not angular changes, in the light path geometry.

It has been found that the foregoing geometrical properties of a multioscillator that includes a dodecahedron-shaped frame results in an instrument that is characterized by a relatively large amount of reciprocal splitting. It can be shown that the reciprocal splitting of this embodiment for so-called "perfect" mirrors that change right circularly polarized light exactly to left circularly polarized light and vice versa is exactly one-third of the cavity free spectral range (f.s.r.). Such a relatively-large amount of reciprocal splitting in a rotation sensor can provide certain advantages including a lesser degree of mode competition. Further, the more-numerous number of sides of the dodecahedral shape permits somewhat greater surface area than the octahedral embodiment of FIGS. 1 and 2. Thus, the various embodiments of this invention are enabled to provide selective operational features.

The reciprocal splitting of the dodecahedral configuration is in contrast to the octahedral embodiment of FIG. 1 which is subject to the same scaling considerations but which can be shown to produce reciprocal splitting close to one fourteenth of a free spectral range.

Figure 4:
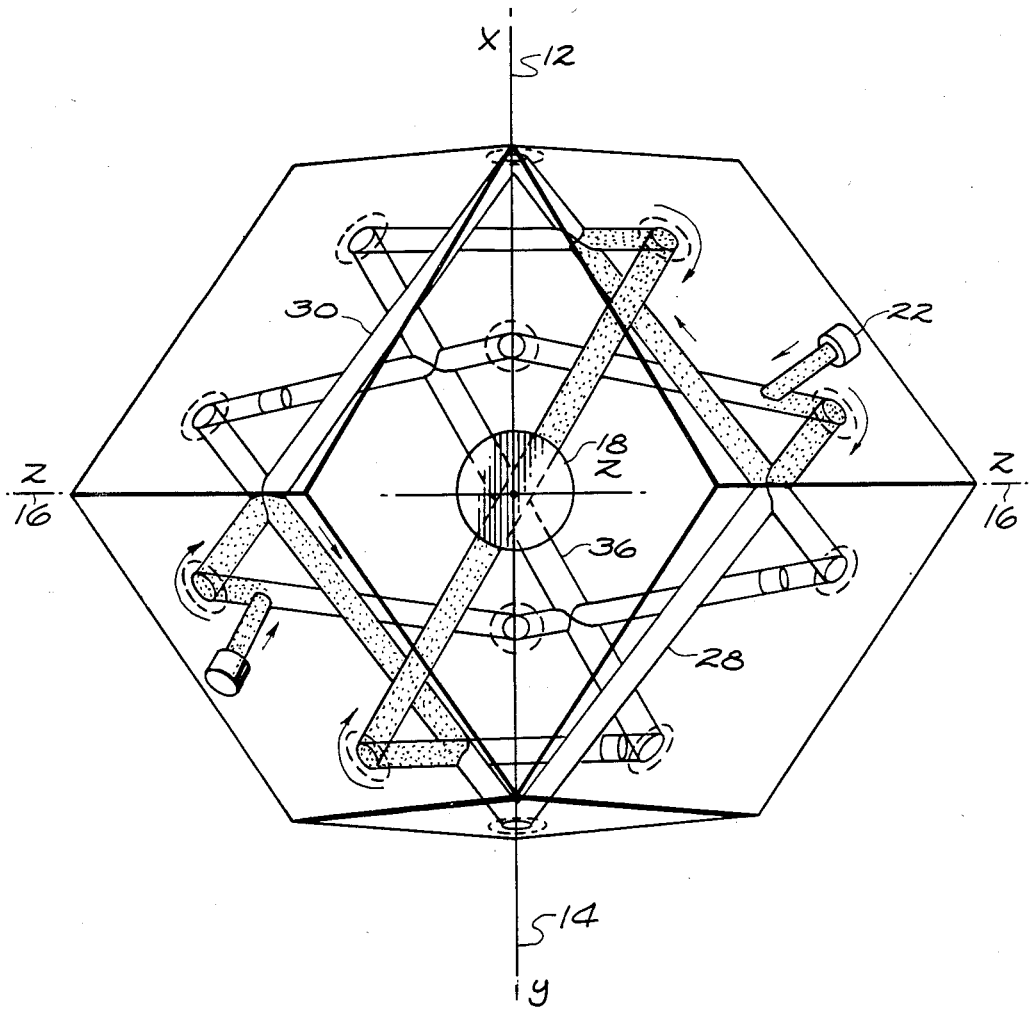
FIG. 4 is the perspective view of the invention of the prior figure including arrows for indicating the paths of gas flow therein.

FIG. 4 is a perspective view of the dodecahedral embodiment of the invention wherein gas flows within the cavities are indicated by arrows. As in FIG. 2, flow emanating from the anode 20 is indicated by darker shading than that emanating from the anode 22. As is apparent from this figure, the desirable cancellation of net flows is achieved in each of the cavities 28, 30 and 36 and thus, as in the prior embodiment, the three-axis symmetric multioscillator of FIG. 3 is substantially uneffected by Fresnel-Frizeau biases.

Thus it is seen that the present invention provides an improved gyroscope of the multioscillator type. While the teachings herein are described with reference to a four mode ring laser gyroscope of the multioscillator type, such teachings are equally applicable to a two mode non-planar ring laser gyroscope for measuring rotation about three axes. By utilizing the teachings of the invention, one can achieve a wide range of accuracies with respect to three orthogonal axes in a single block. By incorporating the instrument into a single block, the effects of thermal variation are minimized. The instrument design provides built-in compensation for otherwise-deleterious FresnelFrizeau effects, thus enhancing its accuracy and durability.

Both of the configurations described herein are amenable to an internal electrode configuration. This is particularly applicable to the cathode. Sputtering processes that occur at the surface of the cathode can considerably shorten the lifetime of a gyro and, for this reason, it is necessary to provide a relatively large electrical surface area for the interior of the cathode. Thus, a practical external cathode can add a large volume to the gyro and create packing problems. The bores in the octahedral and dodecahedral configurations of the multioscillator lie relatively close to the block surfaces and as such the center regions of the blocks can be hollowed out to create regions with large surface areas that, if suitably metalized, can act as cathodes with excellent lifetime characteristics without adding any volume to the overall three-axis sensor.

While this invention has been described with respect to its presently preferred embodiment, it is by no means limited thereto. Rather, the scope of this invention is limited only insofar as defined by the following set of claims and includes all equivalents thereof.

What is claimed is:

1. A ring laser gyroscope for measuring rotation about three mutually orthogonal axes comprising, in combination:
   (a) a three dimensional frame including a plurality of planar surfaces;
   (b) said frame comprising a block having three intersecting, closed non-planar cavities;
   (c) each of said cavities comprising four straight segments of equal lengths
   (d) a plurality of mirrors mounted upon predetermined surfaces of said frame for directing light about said cavities; and
   (e) said cavities and the surfaces of said frame are arranged so that said frame includes at least one mirror mounting surface for affixing one or more mirrors to direct light about at least two of said cavities.

2. A ring laser gyro as defined in claim 1 including a single cathode and two anodes.

3. A ring laser gyro as defined in claim 2 further characterized in that a Faraday element is located within each of said cavities.

4. A ring laser gyro as defined in claim 3 further characterized in that:
   (a) the surfaces of said frame form a regular tetrahedron; and
   (b) each of the four planes of said regular tetrahedron provides a mounting surface for affixing at least one mirror for directing light about each of said cavities.

5. A ring laser gyro as defined in claim 4 further including:
   (a) a pair of bypass tubes for connecting said cavities;
   (b) said anodes and said cathode are in communication with said cavities; and
   (c) said bypass tubes, said cathode and anodes, said Faraday elements and said intersections of said cavities are arranged so that Fresnel-Frizeau effects are cancelled in each of said cavities.

6. A ring laser gyro as defined in claim 3 further characterized in that:
   (a) the surfaces of said frame form a rhombic dodecahedron; and
   (b) three of the surfaces of said rhombic dodecahedron provide mounting surfaces for affixing at least one mirror for directing light about two of said cavities associated with two of said cavities.

7. A ring laser gyro as defined in claim 6 further including:
   (a) said anodes and said cathode are in communication with said cavities; and
   (b) said cathode and anodes and said intersections of said cavities are arranged so that Fresnel-Frizeau effects are cancelled within each of said cavities.

* * * * *